US009410445B2

(12) United States Patent
Song

(10) Patent No.: US 9,410,445 B2
(45) Date of Patent: Aug. 9, 2016

(54) CASTABLE HIGH TEMPERATURE ALUMINUM ALLOY

(75) Inventor: Shihong Gary Song, South Windsor, CT (US)

(73) Assignee: United Technologies Corporation, Hartford, CT (US)

(*) Notice: Subject to any disclaimer, the term of this patent is extended or adjusted under 35 U.S.C. 154(b) by 0 days.

(21) Appl. No.: 13/339,576

(22) Filed: Dec. 29, 2011

(65) Prior Publication Data

US 2012/0111026 A1 May 10, 2012

Related U.S. Application Data

(63) Continuation of application No. 10/770,893, filed on Feb. 3, 2004, which is a continuation-in-part of application No. 10/061,551, filed on Feb. 1, 2002, now abandoned.

(51) Int. Cl.
| | |
|---|---|
| *C22C 21/00* | (2006.01) |
| *F01D 25/00* | (2006.01) |
| *B22D 21/00* | (2006.01) |
| *C22F 1/04* | (2006.01) |
| *C22C 1/02* | (2006.01) |

(52) U.S. Cl.
CPC .............. *F01D 25/00* (2013.01); *B22D 21/007* (2013.01); *C22C 1/026* (2013.01); *C22C 21/00* (2013.01); *C22F 1/04* (2013.01); *F01D 25/005* (2013.01); *F05D 2230/21* (2013.01); *F05D 2300/121* (2013.01); *Y02T 50/671* (2013.01)

(58) Field of Classification Search
CPC ....................................................... C22C 1/026
USPC .......................................................... 420/528
See application file for complete search history.

(56) References Cited

U.S. PATENT DOCUMENTS

| | | | | |
|---|---|---|---|---|
| 2,548,886 | A | * | 4/1951 | Howard ..................... 415/199.5 |
| 3,528,246 | A | * | 9/1970 | Fischer ........................ 60/226.1 |
| 3,807,016 | A | | 4/1974 | Schoerner et al. |
| 3,807,969 | A | | 4/1974 | Schoerner et al. |
| 3,811,846 | A | | 5/1974 | Schoerner et al. |
| 3,830,635 | A | | 8/1974 | Chia et al. |
| 4,142,365 | A | * | 3/1979 | Sargisson et al. ............... 60/204 |
| 4,713,216 | A | * | 12/1987 | Higashi et al. ................ 420/532 |
| 4,790,133 | A | * | 12/1988 | Stuart ........................ 60/226.1 |
| 4,806,307 | A | | 2/1989 | Hirose et al. |
| 4,832,737 | A | | 5/1989 | Mathy et al. |

(Continued)

FOREIGN PATENT DOCUMENTS

| | | |
|---|---|---|
| EP | 0958393 | 11/1999 |
| EP | 1111078 | 6/2001 |

(Continued)

OTHER PUBLICATIONS

Title 40—Protection of Environment, Sec. 86.004-11 Emission standards for 2004 and later model year diesel heavy-duty engines and vehicles.

(Continued)

*Primary Examiner* — Jessee Roe
*Assistant Examiner* — Christopher Kessler
(74) *Attorney, Agent, or Firm* — Carlson, Gaskey & Olds, P.C.

(57) ABSTRACT

A turbine engine includes an airfoil made of an aluminum-rare earth element alloy.

20 Claims, 5 Drawing Sheets

(56) References Cited

U.S. PATENT DOCUMENTS

| | | | |
|---|---|---|---|
| 4,851,193 A | | 7/1989 | Mahajan et al. |
| 4,860,537 A | * | 8/1989 | Taylor .................... 60/226.1 |
| 4,874,440 A | | 10/1989 | Sawtell et al. |
| 4,915,903 A | | 4/1990 | Brupbacher et al. |
| 4,983,358 A | | 1/1991 | Hebsur et al. |
| 5,037,608 A | | 8/1991 | Tarcy et al. |
| 5,045,278 A | | 9/1991 | Das et al. |
| 5,055,257 A | | 10/1991 | Chakrabarti et al. |
| 5,055,527 A | | 10/1991 | Bronstert et al. |
| 5,087,301 A | | 2/1992 | Angers et al. |
| 5,503,798 A | | 4/1996 | Singheiser et al. |
| 5,607,523 A | | 3/1997 | Masumoto et al. |
| 5,624,632 A | | 4/1997 | Baumann et al. |
| 5,776,617 A | | 7/1998 | Brady et al. |
| 5,811,058 A | | 9/1998 | Baba et al. |
| 5,830,288 A | | 11/1998 | Gigliotti, Jr. et al. |
| 6,004,101 A | * | 12/1999 | Schilling et al. .............. 416/224 |
| 6,135,199 A | | 10/2000 | Wyatt-Mair |
| 6,248,453 B1 | | 6/2001 | Watson |
| 6,258,318 B1 | | 7/2001 | Lenczowski et al. |
| 6,315,948 B1 | | 11/2001 | Lenczowski et al. |
| 6,607,355 B2 | | 8/2003 | Cunha et al. |
| 6,622,774 B2 | | 9/2003 | Song |

FOREIGN PATENT DOCUMENTS

| | | |
|---|---|---|
| GB | 2272451 | 5/1994 |
| JP | 1283335 | 11/1989 |
| JP | 3111533 | 5/1991 |
| JP | 413830 | 1/1992 |
| JP | 2001511847 | 8/2001 |
| JP | 2002250791 | 9/2002 |
| RU | 2082806 C1 * | 6/1997 |
| WO | 9610099 | 4/1996 |
| WO | 03104505 | 12/2003 |

OTHER PUBLICATIONS

Binary Alloy Phase Diagrams:, T.B. Massalski; J.L. Murray; L.H. Bennett, Sam, (1986) pp. 110-111, 114-115, 127, 129, 179, 182-184.

C. Barret and T.B. Massalski, Structure of Metals, 3rd edition, Pergamon Press, (1980), pp. 486-534.

M.C. Flemings, Solidification Processing, McGraw Hill, (1974), pp. 12-17.

T.W. Clyne and P.J. Withers, An introduction to Metal Matrix Composites, Cambridge University Press, (1993), pp. 1-11.

J.E. Hatch, Aluminum—Properties and Physical Metallurgy, ASM, Metal Park, OH (1984), pp. 32-39.

P. Haasen, "Physical Metallurgy", 2nd edition (1986), Cambridge University Press, pp. 348-356.

W.A. Kaysser, "Powder Metallurgy for Aerospace Applications", (1994), DLR, German Aerospace Researsch Establishment, Institute of Materials Research, Germany, pp. 3-9.

A. Lawley, Elevated Temperature Aluminum Alloys, The Institute of Metals, London, (1994), pp. 66-75.

P.P. Millan, Jr., High Temperature Powder Metal Aluminum Alloys to Small Gas Turbines, Garrett Turbine Engine Company, Phoenix, Arizona, pp. 225-236, 1983.

W.M. Griffith; R.E. Sanders, Jr.; C.J. Hildeman, Elevated Temperature Aluminum Alloys for Aerospace Applications, Structural Metals Branch, Wright-Patterson, AFB, OH, pp. 209-224, 1982.

Vittorio D'Angelo; Gabriele Tancorre; Sergio Vittori, Properties of "Primal" Aluminium—7% Silicon Casting Alloys, Feb. 1981—Alluminio, pp. 90-94.

A.D. Jatkar; R.R. Sawtell, Aluminum PM Alloys for Aerospace Applications, International Conference on PM Aerospace Materials, (1991), pp. 15-1-15-13.

S.K. Das; L.A. Davis, High Performance Aerospace Alloys via Rapid Solidification Processing, Materials Science and Engineering, (1988), pp. 1-12.

WM. D. Pollock; F.E. Wawner; "Microstructure and Mechanical Properties of High Temperature Aluminum Composites", Symposium on High Temperatures Composites, Technomic Publishing Co., Inc. Lancaster, (19890, pp. 61-71, 1989.

S.L. Langenbeck; W.M. Griffith; G.J. Hildeman; J.W.Simon, "Development of Dispersion-Strengthened Aluminum Alloys", Langenbeck et al. on Dispersion-Strengthened Alloys, pp. 410-422, 1986.

E.W. Blumer, "High Temperature Aluminum Alloy Applications,", The Minerals, Metals & Materials Society, (1991), pp. 241-250.

European Search Report dated Feb. 28, 2006.

* cited by examiner

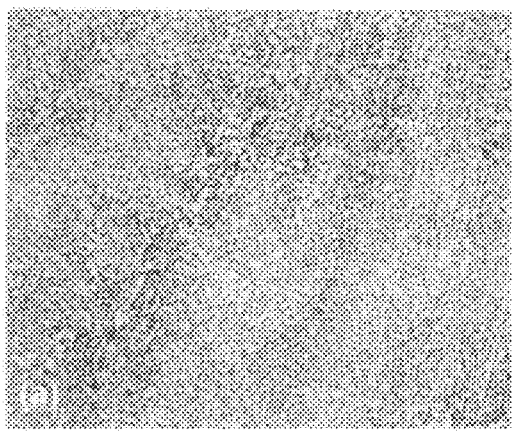 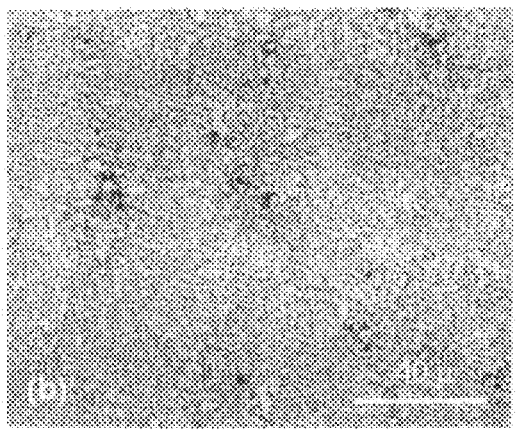
Fig. 4                    Fig. 5

CASTABLE HIGH TEMPERATURE ALUMINUM ALLOY

REFERENCE TO RELATED APPLICATION

This application is a continuation of U.S. patent application Ser. No. 10/770,893 filed Feb. 3, 2004, which is a continuation-in-part of U.S. patent application Ser. No. 10/061,551 filed Feb. 1, 2002, now abandoned.

BACKGROUND OF THE INVENTION

The present invention relates generally to an aluminum alloy suitable for elevated temperature applications.

Gas turbine engines are commonly made of titanium-, iron-cobalt- and nickel-based alloys. During use, many components of the gas turbine engines are commonly subject to elevated temperatures. Lightweight metals, such as aluminum and magnesium, are often used for some components to enhance performance and reduce the weight of engine components. A drawback to employing conventional aluminum alloys is that the strength of many such alloys drops rapidly at temperatures above 150° C., making these alloys unsuitable for certain elevated temperature applications.

Precipitation strengthening is commonly employed to strengthen aluminum alloys. After a primary alloy system, that is either a binary or ternary eutectic, is cast and solidified, it is heat treated at around 500° C. to solution the alloy and optimally arrange the primary alloy elements, such as copper, silicon, and zinc. Rare earth elements are often used as minor alloy elements, typically in quantities of less than 1% by weight. After casting, the aluminum alloy is quenched in water to maintain the alloy elements as a supersaturated solution in the solid aluminum matrix. The aluminum alloy is aged by reheating at appropriate temperatures for various times, e.g., to 160° to 180° C. for 10 to 12 hours, and the elements in the supersaturated solution slowly precipitate out of the aluminum matrix to form fine particles that strengthen the aluminum alloy. The cast shape may then be finished with a machining operation.

There are several drawbacks to prior precipitation strengthening methods used to form an aluminum alloy. For one, the precipitated alloy particles grow at temperatures over 150° C., reducing both the number of alloy particles and the strength of the aluminum alloy. Intermetallic dispersion strengthening overcomes this deficiency by making use of thermally stable particles. However, to achieve an equivalent strengthening effect at ambient temperature, it requires rapid solidification, increasing the processing cost of the aluminum alloy. In previous aluminum alloys, a fine and uniform microstructure is only achievable with slow cooling rates when the system is eutectic and by precipitation and fast cooling.

Hence, there is a need in the art for an improved aluminum alloy that retains strength at elevated temperatures, can be produced by conventional casting methods, and overcomes the other problems of the prior art.

SUMMARY OF THE INVENTION

A disclosed example turbine engine component according to a non-limiting exemplary embodiment includes an airfoil made of an aluminum-rare earth element alloy.

In a further embodiment of the turbine engine component the aluminum-rare earth element alloy has a composition of approximately 1.0 to 20.0% by weight of a first rare earth element selected from a group consisting of ytterbium and gadolinium, approximately 0.1 to 10.0% by weight of at least one second rare earth element selected from a group consisting of gadolinium, erbium and yttrium if said first rare earth element is ytterbium or a group consisting of ytterbium, erbium and yttrium if said first rare earth element is gadolinium and a balance of aluminum.

In a further embodiment of the foregoing turbine engine component the first rare earth element is the ytterbium.

In a further embodiment of the foregoing turbine engine component the first rare earth element is the ytterbium and the at least one second rare earth element is yttrium.

In a further embodiment of the foregoing turbine engine component the aluminum-rare earth alloy includes 14.0-15.0% by weight of the ytterbium and approximately 4% by weight of the yttrium.

In a further embodiment of the foregoing turbine engine component the first rare earth element is the gadolinium.

In a further embodiment of the foregoing turbine engine component the first rare earth element is the gadolinium and the second rare earth element is yttrium.

In a further embodiment of the foregoing turbine engine component the aluminum-rare earth alloy includes 13.0-16.0% by weight of the gadolinium and approximately 4% by weight of the yttrium.

In a further embodiment of the foregoing turbine engine component the aluminum-rare earth alloy has a plurality of insoluble particles of aluminum and a rare earth element, and the insoluble particles are dispersoids that do not coarsen up to 500° C.

In a further embodiment of the foregoing turbine engine component the composition includes less than 5% by weight of the at least one second rare earth element.

In a further embodiment of the foregoing turbine engine component the composition includes at least one minor alloy element selected from a group consisting of copper, zinc, silver, manganese, magnesium, tin, titanium, cobalt or calcium.

In a further embodiment of the foregoing turbine engine component the composition includes a plurality of the minor alloy elements each in an amount of approximately 0.1% to 6% by individual weight and a combined amount of the minor alloy elements is approximately 1.0-15.0% by weight.

In a further embodiment of the foregoing turbine engine component the composition includes at least one minor alloy element selected from a group consisting of manganese, tin, titanium, cobalt or calcium.

In a further embodiment of the foregoing turbine engine component the insoluble particles of aluminum and the first rare earth element are eutectic.

In a further embodiment of the foregoing turbine engine component the composition consists of approximately 1.0 to 20.0% by weight of the first rare earth element, approximately 0.1 to 10.0% by weight of the at least one second rare earth element, approximately 1.0-15.0% by weight of the at least one minor alloy element and the balance of aluminum.

In a further embodiment of the foregoing turbine engine component the at least one minor alloy element is selected from a group consisting of manganese, tin, titanium, cobalt or calcium.

In a further embodiment of the foregoing turbine engine component the composition has a plurality of the minor alloy elements each in an amount of approximately 0.1% to 6% by individual weight and a combined amount of the minor alloy elements is approximately 1.0-15.0% by weight.

In a further embodiment of the foregoing turbine engine component the composition has approximately 14.0-15.0% by weight of the ytterbium and approximately 4% by weight of the yttrium.

In a further embodiment of the foregoing turbine engine component herein the composition has approximately 13.0-16.0% by weight of the gadolinium and approximately 4% by weight of the yttrium.

In a further embodiment of the foregoing turbine engine component the composition has less than 5% by weight of the at least one second rare earth element.

A turbine engine according to another non-limiting exemplary embodiment includes a fan, a compressor, a combustor in fluid communication with the compressor, and a turbine in fluid communication with the combustor. The turbine operative to drive the fan with at least one of the fan, the compressor or the turbine includes an airfoil made of an aluminum-rare earth element alloy.

A method of forming a turbine engine component according to another non-limiting exemplary embodiment includes the steps of casting an airfoil using a composition of an aluminum-rare earth element alloy.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows:

FIG. 4 illustrates an optical microscopy of the as-cast aluminum-ytterbium-yttrium alloy of the present invention;

FIG. 5 illustrates an optical microscopy of the annealed aluminum-ytterbium-yttrium alloy of the present invention;

DETAILED DESCRIPTION

Figure 1:
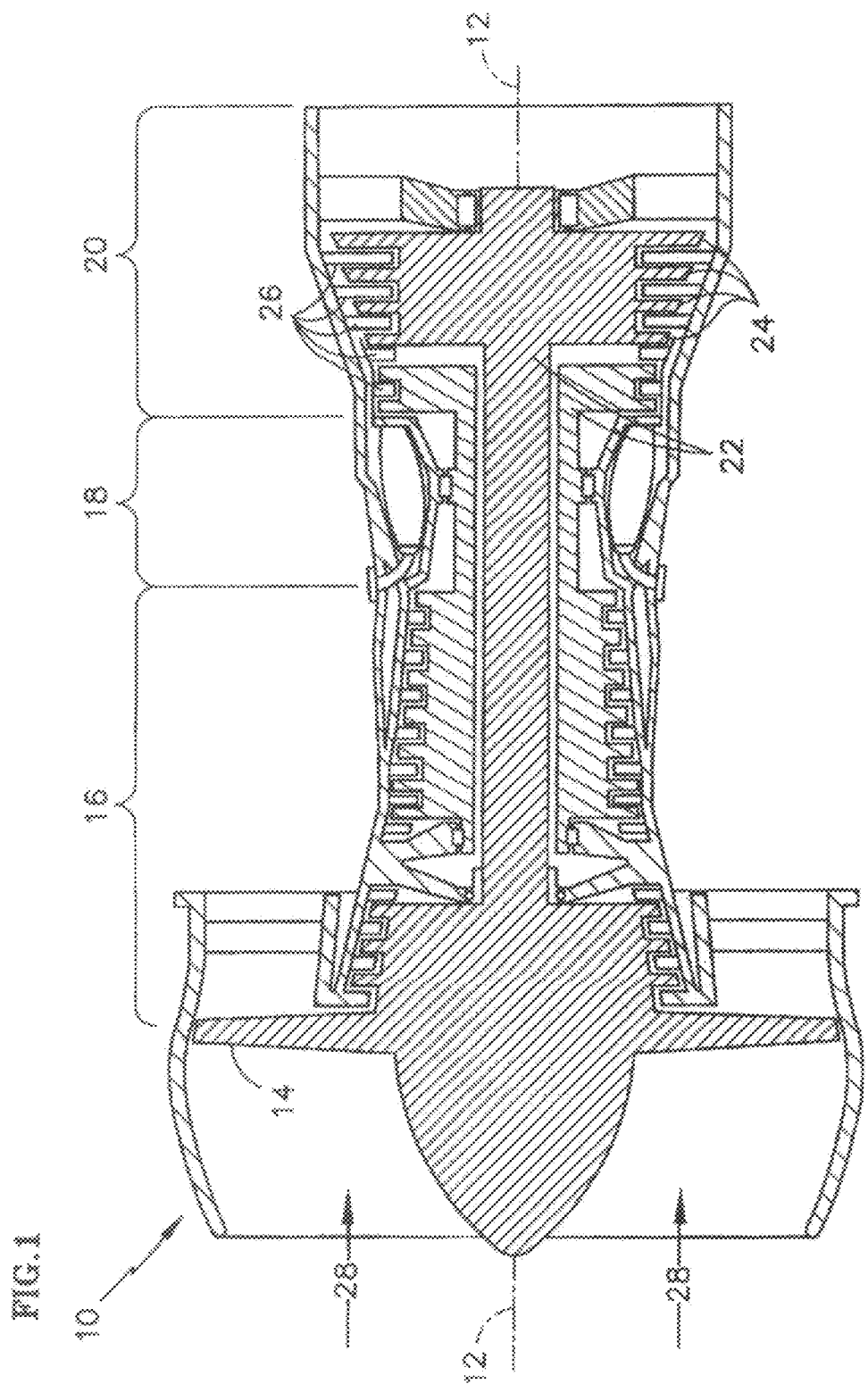
FIG. 1 schematically illustrates a gas turbine engine incorporating the aluminum alloy of the present invention.

FIG. 1 schematically illustrates a gas turbine engine 10 used for power generation or propulsion. The gas turbine engine 10 includes an axial centerline 12 and includes a fan 14, a compressor 16, a combustion section 18 and a turbine 20. Air compressed in the compressor 16 is mixed with fuel and burned in the combustion section 18 and expanded in the turbine 20. The air compressed in the compressor 16 and the fuel mixture expanded in the turbine 20 are both referred to as a hot gas stream flow 28. Rotors 22 of the turbine 20 rotate in response to the expansion and drive the compressor 16 and the fan 14. The turbine 20 also includes alternating rows of rotary airfoils or blades 24 on the rotors and static airfoils or vanes 26.

In one example aluminum alloy, certain components of the gas turbine engine 10 can be made of an aluminum-rare earth element alloy. The aluminum alloy includes approximately 1.0 to 20.0% by weight of a rare earth element including ytterbium, erbium, yttrium, and gadolinium. In one example, the aluminum alloy includes approximately 1.0 to 20.0% ytterbium.

The aluminum alloy can also include amounts of one or more other rare earth elements including yttrium, erbium and gadolinium. Preferably, the aluminum alloy includes approximately 0.1 to 10.0% total by weight of the other rare earth elements. That is, the total weight of all the other rare earth element(s) in the aluminum alloy is approximately 0.1 to 10.0%. Preferably, the other rare earth element is yttrium. Ytterbium and yttrium form an eutectic $Al_3X$ intermetallic compounds with a simple lattice structure. A coherent or semi-coherence interface can exist between the aluminum matrix and the $Al_3X$ intermetallic compound in nucleation and the early stage of growth during solidification. The melting point of the $Al_3X$ intermetallic compound is significantly higher than the melting point of aluminum, but the alloy eutectic temperature is not significantly lower than the melting point of aluminum. Although ytterbium is disclosed as the other rare earth alloy element, it is to be understood that any or all of the other rare earth elements can be employed.

In one embodiment, the aluminum-ytterbium alloy of the present invention includes approximately 14.0 to 15.0% ytterbium by weight and approximately 4.0% of yttrium by weight as the other rare earth element.

One or more minor alloy elements are also employed in the range of approximately 1.0 to 15% total by weight. That is, the total weight of all the minor alloy elements in the aluminum alloy is approximately 1.0 to 15.0%. Preferably, the minor alloy elements include copper, zinc, silver, magnesium, manganese, tin, calcium, titanium and cobalt. Any combination of the listed minor alloy elements can be employed. Preferably, the individual weight of each minor alloy element employed in the total is approximately 0.1% to 6%. The remainder of the aluminum alloy is the aluminum matrix.

The aluminum alloy of the present invention has a density ranging from 2.78 to 3.1 $g/cm^2$ and is more than 30.0% lighter than titanium (4.5 $g/cm^2$). Ytterbium and yttrium have a near-zero solubility in the aluminum matrix, and thus the alloy exhibits good long term stability. The dispersoids in the aluminum alloy of the present invention does not coarsen appreciably up to 500° C. and retain considerable strength of the alloy at elevated temperatures up to 375° C.

After casting the aluminum-rare earth alloy into the desired shape, the aluminum alloy is solidified and cooled. During solidification, the aluminum matrix excludes the rare earth elements from the aluminum matrix, forming eutectic rare earth-containing dispersoids that strengthen the aluminum alloy. Casting also creates a low density of dislocations.

Figure 2:
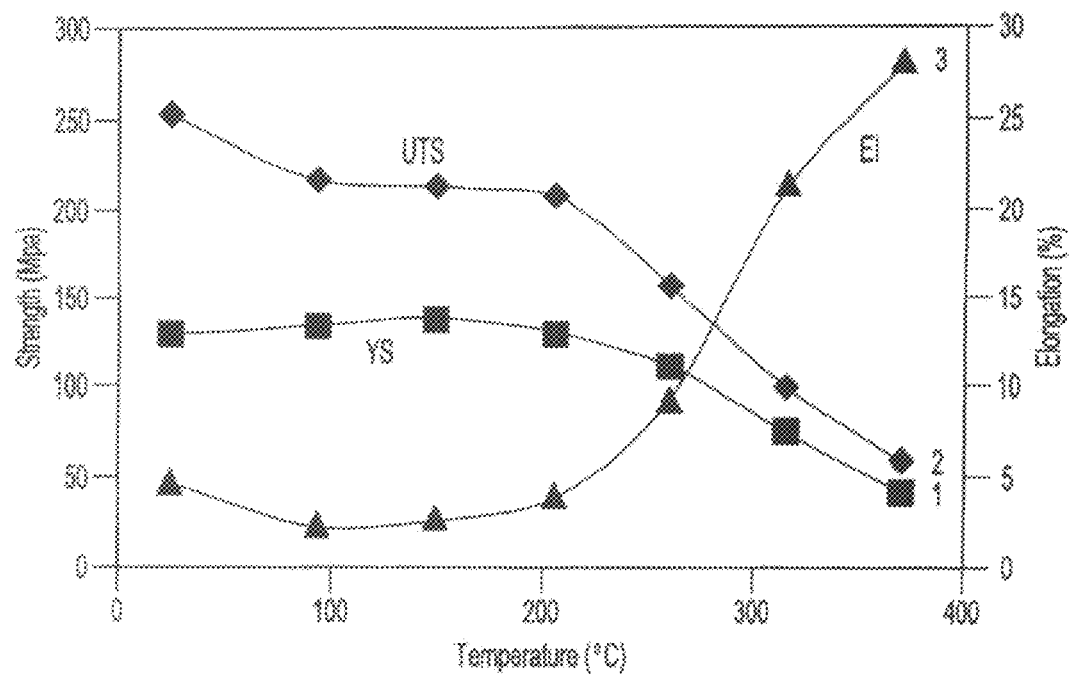
FIG. 2 illustrates a graph illustrating the tensile properties of the aluminum-ytterbium-yttrium alloy of the present invention as a function of temperature.

FIG. 2 illustrates the temperature dependencies of the tensile properties of the diecast aluminum-ytterbium-yttrium alloy of the present invention. The yield strength of the aluminum-ytterbium-yttrium alloy remains approximately the same from 24° C. to 205° C., followed by a slow decrease in strength at temperatures greater than 205° C. (line 1). The elongation (line 3) remains steady and increases at temperatures over 205° C., and the ultimate tensile strength (line 2) decreases with temperature.

Figure 3:
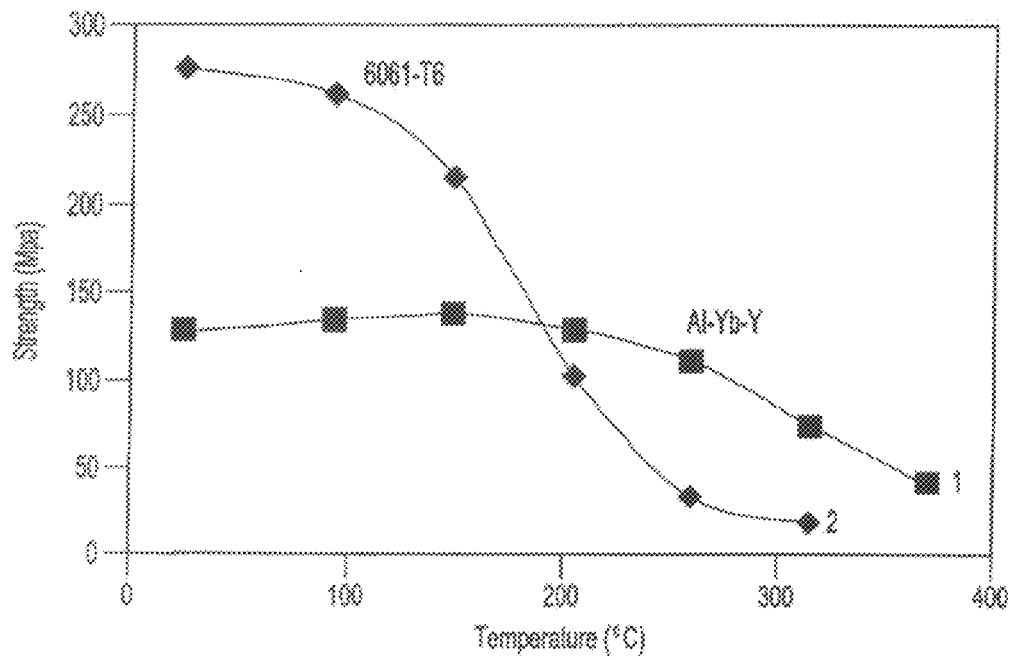
FIG. 3 illustrates a graph comparing the yield strength of the aluminum-ytterbium-yttrium alloy of the present invention to the 6061-T6 alloy as a function of temperature.

FIG. 3 compares the yield strength of an as-cast aluminum-ytterbium-yttrium alloy of the invention (line 1) with the yield strength of a conventional precipitation strengthened aluminum alloy 6061-T6 after age-hardening (line 2), as a function of temperature. The 6061-T6 alloy has a high yield strength at 24° C., but the yield strength drops rapidly at temperatures above 150° C. The yield strength of the 6061-T6 alloy drops below the yield strength of the aluminum-ytterbium-yttrium alloy of the present invention at about 190° C. as a result of particle coarsening, which weakens most of the conventional aluminum alloys, including the 6061-T6 alloy.

FIGS. 4 and 5 compare optical micrographs of the aluminum-ytterbium-yttrium alloy as-cast and after annealing, respectively. The annealing was carried out at 500° C. for 62 hours. As shown, there is no clear difference in the as-cast and the annealed samples in terms of particle size, except for a few enlarged grain boundary particles in the annealed sample.

In another example, certain components of the gas turbine engine 10 can be made of an aluminum-gadolinium alloy. The aluminum-gadolinium alloy includes approximately 1.0 to 20.0% by weight of gadolinium. Gadolinium forms a eutectic binary $Al_3Gd$ intermetallic compound with a simple lattice structure. A coherent or semi-coherence interface can exist between the aluminum matrix and the $Al_3Gd$ intermetallic compound in nucleation and the early stage of growth during solidification. The melting point of the $Al_3Gd$ intermetallic compound is significantly higher than the melting point of aluminum, but the alloy eutectic temperature is not significantly lower than the melting point of aluminum.

Gadolinium is a rare earth element that is less expensive than other rare earth elements, such as ytterbium, erbium and yttrium. Gadolinium weight is between the light and heavy rare earth elements. Gadolinium is also presently 70% the price of yttrium. The aluminum-gadolinium system has the highest rare earth content at the binary eutectic composition among all the other binary aluminum rare earth systems, typically less than 5.0%. $Al_3Gd$ intermetallic compound is the most stable in terms of the incipient melting point, which is 1125° C. The crystal structure of $Al_3Gd$ intermetallic compound is most similar to $Al_3Y$ intermetallic compound and can easily form a coherent and semi-coherent interface with the aluminum matrix. During solidification, the aluminum matrix excludes the gadolinium from the aluminum matrix, forming eutectic gadolinium-containing dispersoids that strengthen the aluminum matrix.

The aluminum alloy can also include small amounts of one or more other rare earth elements including ytterbium, erbium, and yttrium. Preferably, the aluminum alloy includes approximately 0.1 to 10.0% total by weight of the other rare earth elements. That is, the total weight of all the other rare earth elements in the aluminum alloy is approximately 0.1 to 10.0%. More preferably, the aluminum alloy includes less than approximately 5.0% of these rare earth elements.

In one embodiment, the aluminum-gadolinium alloy of the present invention includes approximately 13.0 to 16.0% gadolinium by weight and approximately 4.0% of yttrium by weight as the other rare earth element.

Minor alloy elements are also employed in the range of approximately 1.0 to 15.0% total by weight. Preferably, the minor alloy elements includes copper, zinc, silver, magnesium, manganese, tin, titanium, cobalt and calcium. That is, the total weight of all the minor alloy elements in the aluminum alloy is approximately 1.0 to 15.0%. Preferably, the individual weight of each minor alloy element employed in the total is approximately 0.1% to 6%. The remainder of the alloy is the aluminum matrix.

The aluminum-gadolinium alloy of the present invention has a density ranging from 2.78 to 3.1 $g/cm^2$ and is more than 30.0% lighter than titanium (4.5 $g/cm^2$). Gadolinium and yttrium have a near-zero solubility in the aluminum matrix. The dispersoids in the aluminum-gadolinium alloy of the present invention does not coarsen appreciably up to 500° C. and retain considerable strength at elevated temperatures up to 375° C.

Figure 6:
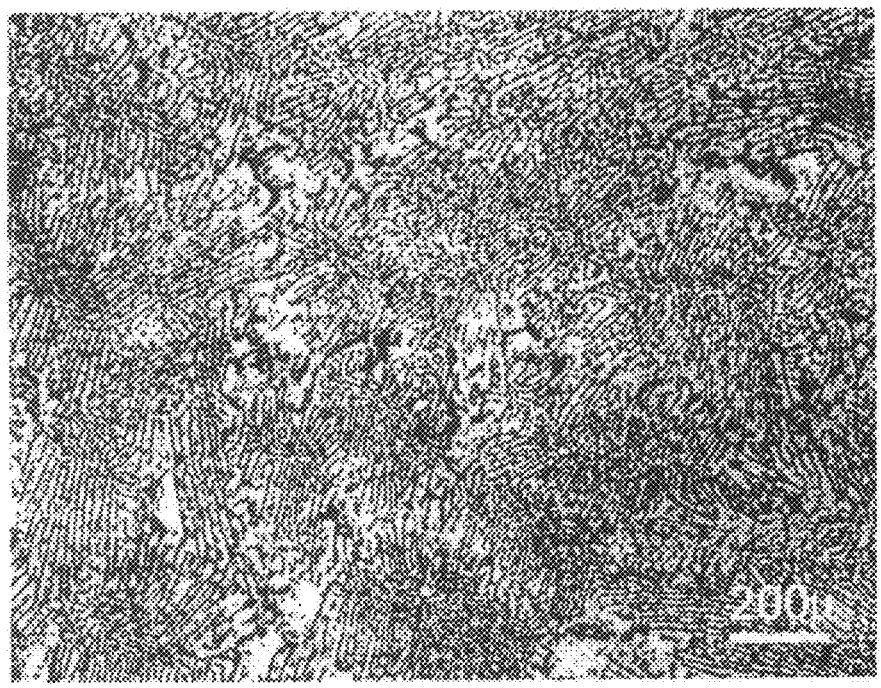
FIG. 6 illustrates an optical microscopy of the as-cast aluminum-gadolinium alloy of the present invention.

After casting the aluminum-gadolinium alloy into the desired shape, the aluminum alloy is solidified and cooled. During solidification, the aluminum matrix excludes the gadolinium from the aluminum matrix, forming eutectic gadolinium-containing dispersoids that strengthen the aluminum alloy. FIG. 6 illustrates an optical micrograph of the aluminum gadolinium alloy as-cast. Casting also creates a low density of dislocations.

Figure 7:
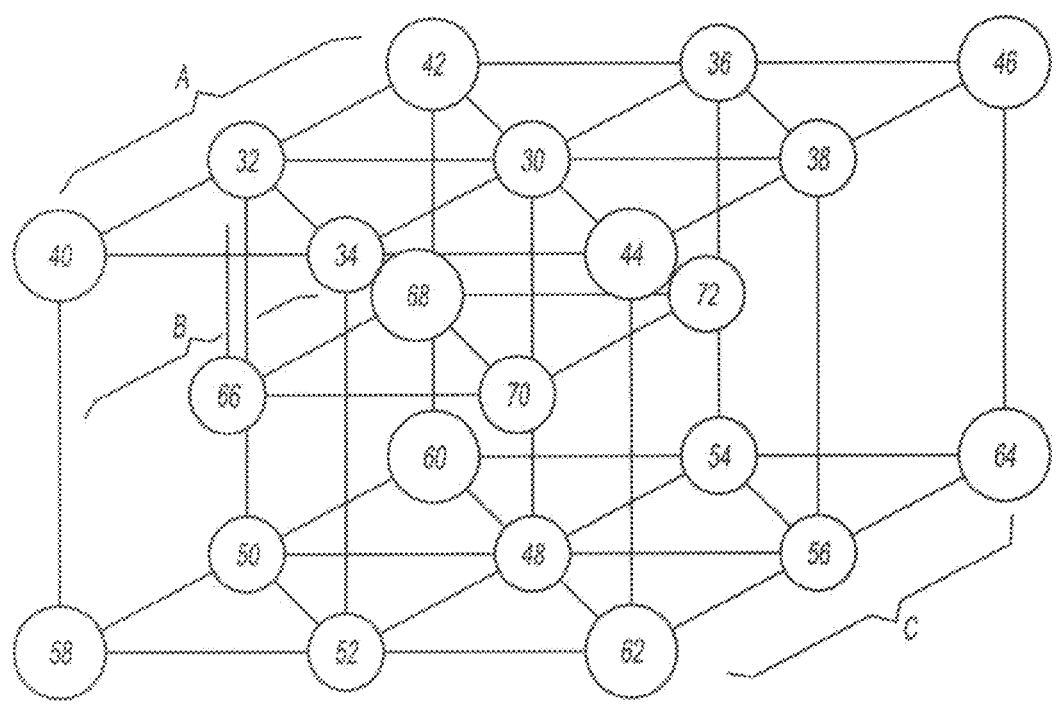
FIG. 7 schematically illustrates the lattice structure of the aluminum-gadolinium alloy of the present invention.

FIG. 7 illustrates the lattice structure of the aluminum-gadolinium intermetallic compound of the present invention. The aluminum-gadolinium alloy forms a hexagonal intermetallic structure. In a first plane A, the aluminum atoms are illustrated as reference numerals 30, 32, 34, 36 and 38, and the gadolinium atoms are illustrated as reference numerals 40, 42, 44 and 46. Each aluminum atom is surrounded by six atoms: four aluminum atoms and two gadolinium atoms. The aluminum atom 30 in the first plane A is surrounded by six atoms, forming a hexagon. The aluminum atom 30 is surrounded by four aluminum atoms 32, 34, 36 and 38 and two gadolinium atoms 42 and 44. In a third plane C, the aluminum atoms are illustrated as reference numerals 48, 50, 52, 54 and 56, and the gadolinium atoms are illustrated as reference numerals 58, 60, 62, and 64. Each aluminum atom is surrounded by six atoms: four aluminum atoms and two gadolinium atoms. For example, the aluminum atom 48 in the first plane C is surrounded by six atoms, forming a hexagon. The aluminum atom 48 is surrounded by four aluminum atoms 50, 52, 54 and 56 and two gadolinium atoms 60 and 62. As shown, the atoms in the first plane A are aligned with the atoms in the third plane C. That is, the aluminum atoms in the first plane A are directly over the aluminum atoms in the third plane C, and the gadolinium atoms in the first plane A are directly above the gadolinium atoms in the third plane C. The aluminum-gadolinium matrix includes a second plane B between the first plane A and the third plane. C. The atoms in the second plane form the same pattern as the atoms in the first plane A and the third plane C, but are slightly offset from these planes. As shown, the aluminum atom 66 is slightly offset from the aluminum atoms 32 and 50, the aluminum atom 70 is slightly offset from the aluminum atoms 30 and 48, and the aluminum atom 72 is slightly offset from the aluminum atom 36 and 54. The gadolinium atom 68 is also slightly offset from the gadolinium atoms 42 and 60. By offset, it is meant that atoms in the second plane B are not aligned with the atoms in the first plane A and the second plane C along the vertical direction. The lattice structure is similar to that of the aluminum matrix such that a coherent or semi-coherent lattice relationship between the aluminum-gadolinium compound and the matrix is possible When forming the aluminum alloys of the present invention, all of the components are added to a crucible. The components are then heated, melted and then stirred. The rare earth elements and the minor alloy elements are added to and well dispersed in the aluminum matrix in the molten state. The melted components are then poured into a mold and cooled to form a pre-alloy ingot.

The pre-alloy ingot is then formed into the desired shape by casting. In the casting process, the pre-alloy ingot is remelted and poured into a mold having a cavity having the desired shape of the final part in ambient conditions.

Various casting methods can be utilized to form the desired part of the gas turbine engine. In one example, sand casting is employed to form the final part. First, the features of the finished part are carved in wood or molded in plastic. A mixture of sand, a polymer material and oil are mixed together and pressed into the carved wood or molded plastic. The mixture sticks into the carved shape to form a cavity of a mold. The molten pre-alloy ingot is then poured into the cavity to form the part. Sand casting is inexpensive and beneficial for making engine parts having a complex geometry and a low production volume. This method can be utilized for engine housing manufacturing, allowing for more design flexibility.

Investment casting can also be employed to form the desired part. First, a wax form having the shape of the final part is formed. A coating of ceramic is then applied to the wax form. The number of coatings applied depends on the thickness needed, and one skilled in the art would know how many layers to employ. The ceramic coated wax form is then heated in a furnace to melt the wax, leaving the ceramic coated shell. Investment casting can be utilized for engine housing manufacturing, allowing for more design flexibility. Although relatively expensive because of the tooling and the process of shell molds, investment casting is beneficial for making engine parts having a complex geometry, allowing parts to be cast with greater precisions and complexity.

Alternately, the final part can be formed by die casting. After melting the pre-alloy ingot, it is poured into a cavity of a die having the features of the finalized part. Once cooled, the part is removed from the die. A finishing operation may be required. Diecasting is advantageous as it allows for relatively fast cooling ($10^{1\sim 2}$ K/sec) and high production rates. This method is beneficial in producing small engine vanes which require high strength.

The aluminum alloy is cast and processed into the near-net shape for engine applications with a minimum amount of machining and without post-casting solution and aging treatments. However, additional heat treatments can be employed to exclude and bring out the minor alloy elements. The aluminum alloy is strengthened largely by the aluminum rare earth dispersoids. Any later heat treatment does not significantly alter the condition of the rare earth elements in the aluminum matrix because the rare earth elements exists in the form of $Al_3X$ particles or dispersoids, which are stable. After casting the aluminum alloy into the desired shape, the aluminum alloy is solidified and cooled.

Preferably, the aluminum alloy is cooled at a rate of $10^{1\sim 2}$ K/sec, which is typical of many conventional casting methods. As the system is eutectic and a coherent or semi-coherent lattice relationship exists between the $Al_3X$ dispersoids and the aluminum matrix, high strength and high thermal stability is achieved even though slow cooling rates are employed.

There are several advantages to the aluminum alloy of the present invention. For one, the aluminum alloy has good strength at elevated temperatures and high thermal stability up to 375° C. The aluminum alloys also have good castability, suitable for production by most conventional casting methods. The strengthening phases have high melting points and can be cast into fine and well disbursed particles that strengthen the aluminum matrix. When used to replace titanium or steel parts in gas turbine engine components, the aluminum alloys of the present invention can lead to substantial cost savings in addition to the aforementioned weight savings.

The foregoing description is exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention.

What is claimed is:

1. A turbine engine comprising:
an engine core passage and an engine bypass passage defined by a bypass passage outer case extending around the engine core passage;
a cast fan situated at an inlet of the engine bypass passage such that rotation of the cast fan moves air through the engine bypass passage;
a compressor within the engine core passage;
a combustor in fluid communication with the compressor; and
a turbine within the engine core passage and in fluid communication with the combustor, the turbine being operative to drive the cast fan,
wherein the cast fan includes an airfoil made of an aluminum-rare earth element alloy, and the aluminum-rare earth element alloy has a composition of approximately 1.0 to 20.0% by weight of a first rare earth element selected from a group consisting of ytterbium and gadolinium, approximately 0.1 to 10.0% by weight of at least one second rare earth element selected from a group consisting of gadolinium, erbium and yttrium if said first rare earth element is ytterbium or a group consisting of ytterbium, erbium and yttrium if said first rare earth element is gadolinium and a balance of aluminum, and a plurality of insoluble particles of aluminum and the first rare earth element.

2. The turbine engine as recited in claim 1, wherein the first rare earth element is the ytterbium.

3. The turbine engine as recited in claim 1, wherein the first rare earth element is the ytterbium and the at least one second rare earth element is yttrium.

4. The turbine engine as recited in claim 3, including 14.0-15.0% by weight of the ytterbium and approximately 4% by weight of the yttrium.

5. The turbine engine as recited in claim 1, wherein the first rare earth element is the gadolinium.

6. The turbine engine as recited in claim 1, wherein the first rare earth element is the gadolinium and the second rare earth element is yttrium.

7. The turbine engine as recited in claim 6, including 13.0-16.0% by weight of the gadolinium and approximately 4% by weight of the yttrium.

8. The turbine engine as recited in claim 1, wherein the aluminum-rare earth alloy has a plurality of insoluble particles of aluminum and a rare earth element, and the insoluble particles are dispersoids that do not coarsen up to 500° C.

9. The turbine engine as recited in claim 1, wherein the composition includes less than 5% by weight of the at least one second rare earth element.

10. The turbine engine as recited in claim 1, wherein the composition includes at least one minor alloy element selected from a group consisting of copper, zinc, silver, manganese, magnesium, tin, titanium, cobalt or calcium.

11. The turbine engine as recited in claim 10, wherein the composition consists of approximately 1.0 to 20.0% by weight of the first rare earth element, approximately 0.1 to 10.0% by weight of the at least one second rare earth element, approximately 1.0-15.0% by weight of the at least one minor alloy element and the balance of aluminum.

12. The turbine engine as recited in claim 11, wherein the at least one minor alloy element is selected from a group consisting of manganese, tin, titanium, cobalt or calcium.

13. The turbine engine as recited in claim 11, wherein the composition has a plurality of the minor alloy elements each in an amount of approximately 0.1% to 6% by individual weight and a combined amount of the minor alloy elements is approximately 1.0-15.0% by weight.

14. The turbine engine as recited in claim 11, wherein the composition has approximately 14.0-15.0% by weight of the ytterbium and approximately 4% by weight of the yttrium.

15. The turbine engine as recited in claim 11, wherein the composition has approximately 13.0-16.0% by weight of the gadolinium and approximately 4% by weight of the yttrium.

16. The turbine engine as recited in claim 11, wherein the composition has less than 5% by weight of the at least one second rare earth element.

17. The turbine engine as recited in claim 10, wherein the composition includes a plurality of the minor alloy elements each in an amount of approximately 0.1% to 6% by individual weight and a combined amount of the minor alloy elements is approximately 1.0-15.0% by weight.

18. The turbine engine as recited in claim 1, wherein the composition includes at least one minor alloy element selected from a group consisting of manganese, tin, titanium, cobalt or calcium.

19. The turbine engine as recited in claim 1, wherein the insoluble particles of aluminum and the first rare earth element are eutectic.

20. The turbine engine as recited in claim 1, wherein the composition includes at least two minor alloy elements selected from a group consisting of copper, zinc, silver, manganese, magnesium, tin, titanium, cobalt and calcium, and each of the minor alloy elements being present in the composition in an amount of 0.1% to 6% by individual weight, and a combined amount of all of the minor alloy elements is 1.0-15.0% by weight.

\* \* \* \* \*